United States Patent [19]

Sekiguchi

[11] 4,345,271
[45] Aug. 17, 1982

[54] TELEVISION CAMERA
[75] Inventor: Takeshi Sekiguchi, Kawasaki, Japan
[73] Assignee: Canon Kabushiki Kaisha, Tokyo, Japan
[21] Appl. No.: 199,264
[22] Filed: Oct. 21, 1980
[30] Foreign Application Priority Data
  Oct. 24, 1979 [JP] Japan ............................... 54-137236
  Oct. 24, 1979 [JP] Japan ............................... 54-137237
[51] Int. Cl.³ ............................................. H04N 9/10
[52] U.S. Cl. ....................................... 358/55; 358/10; 358/41
[58] Field of Search ....................... 358/10, 29, 41, 55, 358/139

[56] References Cited
U.S. PATENT DOCUMENTS 3,293,357 12/1966 Doi et al. ............................. 358/55
3,381,084 4/1968 Wheeler ............................... 358/55
3,610,818 10/1971 Bachmann ........................... 358/55
3,718,752 2/1973 Katsuta ................................. 358/55
4,223,350 9/1980 Moutet ................................. 358/10
4,237,475 12/1980 Sekiguchi ............................ 358/41

Primary Examiner—Michael A. Masinick
Attorney, Agent, or Firm—Fitzpatrick, Cella, Harper & Scinto

[57] ABSTRACT

A television camera in accordance with this invention includes an objective lens for receiving a light from a scene, said objective lens including a front lens part and a rear lens part, a color-separating combination prism disposed adjacent to said objective lens at its image side, an image-taking devices for sensing color-separated images which are formed by both said objective lens and said prism, a test pattern chart, a light-guiding path for conducting a light passed through said front lens part to illuminate said test chart, and an image-transmitting path for conducting a light from said test chart to said rear lens part to provide an image of the test chart to said image-taking devices.

12 Claims, 3 Drawing Figures

TELEVISION CAMERA

BACKGROUND OF THE INVENTION

1. Field of the Invention

This invention relates to a television camera, particularly having a projector for a test pattern chart used to regulate image taking devices, which projector may be fixedly or detachably mounted in the camera.

2. Description of the Prior Arts

Most of the color television cameras which are presently used for broadcast are of such a type that three pickup tubes are used. These television cameras must be adjusted in accordance with a sequence of operations to ensure good quality of colored pictures after an old pickup tube has been replaced by a fresh pickup tube, or during periodical maintenance, or before the cameras are actually utilized. This is normally accomplished mainly by illuminating test patterns for resolution, registration scale, gray scale and the like in a uniform manner, positioning the camera lens properly at a location opposed to the test patterns before they are framed into their normal sizes, and thereafter operating the regulators of a central control unit, part of which is located on the camera. In order to take such test patterns, transparent and reflective test patterns are normally utilized to be illuminated by an external light. This process, however, is troublesome and time-consuming since a pattern must be replaced by another pattern to be in turn set in each image-taking operation.

Modern color television cameras have been remarkably improved in stability. Nevertheless, these cameras must be sometimes checked by using the test patterns even at work. For such a reason, it is difficult to use the above adjusting process.

In order to overcome the above problems for increasing the workability of the color television cameras, there has been proposed a color television camera which is provided with a zoom lens containing a test-pattern projector therein, the zoom lens being normally used as an objective lens in the camera. However, this camera is used only as an auxiliary one because of its imperfect performance.

The prior art will now be described in connection with the accompanying drawings.

FIG. 1 illustrates a process in the prior art wherein test patterns are image-taken by illuminating them with an external beam of light. For example, if a reflective test pattern chart 2 for gray scale or the like is illuminated by a beam of light from a source of light 1, the reflected light from the chart 2 passes through a zoom lens X into a color separation prism system Y, the zoom lens consisting of a zoom portion I and a relay portion II. In the color separation prism Y, the light is separated into the respective color portions in red, green and blue zones each of which is focused on the light-receiving surfaces of image pickup tubes 3R, 3G and 3B. The chart 2 is normally illuminated by the source of light 1 under a standard image-taking condition, that is of a color temperature of 3,000° K. and an illumination intensity of 2,000 luxes. The light-receiving surfaces of the image pickup tubes are adjusted in brightness by an iris diaphragm 4 in the zoom lens X.

On the other hand, the prior art image-taking process which utilizes a television camera with a pattern projector contained therein includes a step of illuminating a transparent test pattern chart 2' as for a gray scale or the like through a condenser lens 9 by a source of light 1' which is a tungsten lamp, for example. The light passed through the chart 2' is reflected by a reflector 12 toward a projecting lens 8. The light from the projecting lens 8 is reflected by the surface 12 of a prism-shaped half mirror 6 which is disposed between a forward group of relay lenses 5 and a rearward group of relay lenses 7 in the relay portion II of the zoom lens X. The reflected light is thereafter separated into the respective color portions in red, green and blue zones each of which is transmitted on the image pickup tubes 3R, 3G and 3B, respectively. At this time, the image of the chart 2' is formed on the light-receiving surfaces of the image pickup tubes 3R, 3G and 3B by the projecting lens 8 and the rearward group of relay lenses 7.

Normally, the light source 1 for the contained pattern projector is energized by a source of electric power which is common to the circuit of the color television camera and which is of a stabilized D. C. voltage of 24 V and a current capacity of 0.75 A. Accordingly, a high color temperature lamp such as a halogen lamp, an optical lamp with a flatwise filament or the like cannot be used as the light source 1' so that the conventional tungsten lamp will be used with its color temperature of 2,550° K. ± 50° K. which is lower by about 450° K. than that of the light source 1 as an external light.

The zoom lens X has a spectral transmittivity that absorbs the light portion in the blue zone more than those in the green and red zones because the zoom lens is generally made of glass having high refractive index in consideration of correction in aberration. On the other hand, the optical system for the pattern projector has a total thickness much less than that of the zoom lens and is made of a relative small amount of glass having high refractive index so that such an optical system will absorb less light in the blue zone compared with the zoom lens X.

If the light-receiving surface of the image pickup tube 3G for light in the green zone has a value in brightness, the light-receiving surface of the pickup tube 3R for light in the red zone will be relatively bright in the image-taking system using the contained pattern projector whereas the light-receiving surface of the pickup tube 3B for light in blue zone will be relatively bright in the image-taking system using the external beam of light. Therefore, the image-taking system using the pattern projector includes a color filter (spectrum-correcting filter) 10 and a neutral density (ND) filter 11 both of which are located near the condenser lens 9 of the contained pattern projector for causing the brightness to coincide with that in the image-taking system using the external beam of light.

In both the prior art image-taking systems, therefore, they are coincident with each other only in a specific color temperature (3,000° K. in the above embodiment).

Recently, there have been developed high performances compact television cameras which can be widely used to relay a broadcast from a stadium, theater or the like other than an indoor studio. Moreover, even news cameramen have utilized television cameras of small size which are called an electro news gatherer (ENG), instead of 16 mm moving picture cameras.

Therefore, the television cameras must image-take (i.e. effect protosensitive conversion of) objects over a very wide range of illumination. For example, if an outdoor object is taken, its color temperature will change moment by moment in such a manner that it is 2,000° K. to 4,000° K. in the morning and evening whereas it is 6,000° K. to 7,000° K. in the day. Under such an illuminating condition, the prior art television cameras were adjusted in the following manner. The conventional television cameras are set at a design-reference color temperature of 3,000° K. or 3,200° K. For example, when an object is image-taken under an illuminating condition of color temperature, 6,000° K., by a television camera having its design-reference color temperature of 3,000° K., a color-temperature changing filter contained in the television camera is used to change the color temperature from 6,000° K. to 3,000° K., which filter is normally disposed between the zoom lens X and the color separation prism system Y, in such a manner that the gray scale chart illuminated at the color temperature of 6,000° K. is image-taken through the zoom lens X to regulate the amplification factors at the outputs of the red and blue pickup tubes to adjust a balance in white and black. If such a color changing filter is not available, any filter having the nearest changing capacity can be used for the same purpose.

In the prior art pattern projector, however, its color temperature is fixed so that the pattern projector cannot provide for the change of color temperature as described hereinbefore.

It is apparent from the foregoing that the prior art pattern projector contained in the television camera cannot provide, for various reasons, the same image-taking state of test pattern as in the image-taking system using the external source of light so that the projector will be used only as an auxiliary instrument.

SUMMARY OF THE INVENTION

It is an object of this invention to provide a television camera including a test chart which is located in the interior thereof and yet is capable of obtaining the same adjustment as in an image taking device using a test chart which is disposed outside the camera.

Another object of this invention is to provide a television camera of the above type wherein the test chart can be illuminated by a source of light located within the camera when an object illuminated by an illuminating light having a predetermined color temperature is image-taken.

DESCRIPTION OF THE PREFERRED EMBODIMENTS

Figure 2:
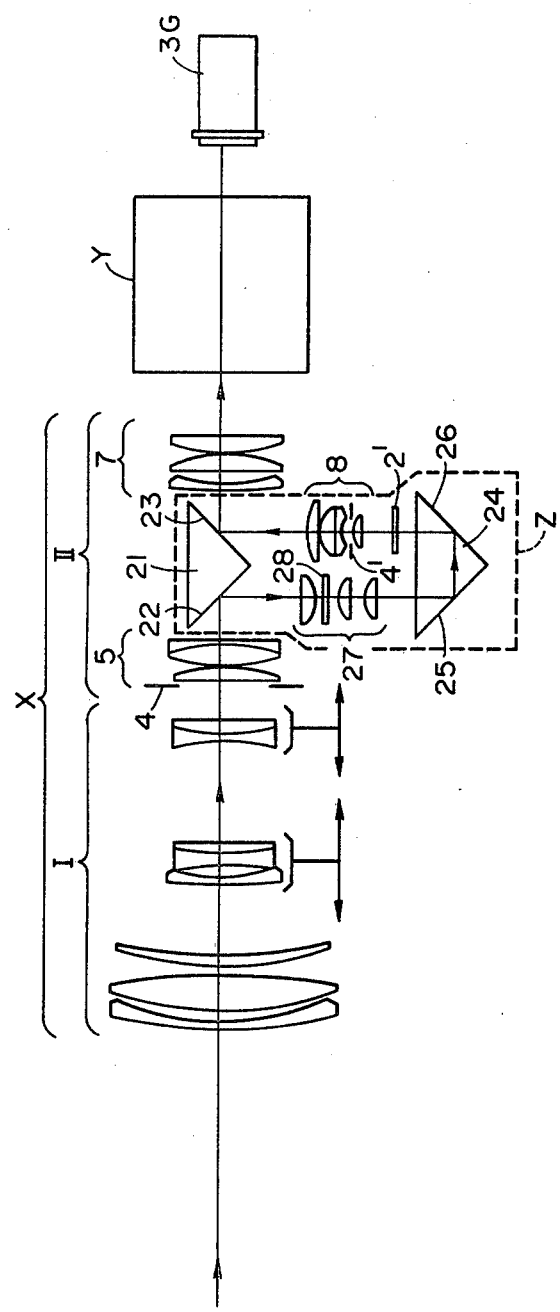
FIG. 2 is a sectional view of an optical system in a television camera which is an embodiment of this invention.

In FIG. 2, an optical system of a television camera according to this invention includes a zoom lens X consisting of a zoom portion I and a relay lens portion II. The zoom portion I consists of a focusing lens, variator and compensator in succession starting from the forward end as viewed in FIG. 2. The relay lens portion II comprises a forward group 5 and a rearward group 7. The optical system further includes a color separation prism combination Y and image pickup tubes (only one shown by 3G).

A pattern projector Z can be fixedly or detachably mounted on the camera body. The pattern projector includes a test pattern chart 2' and a prism-shaped mirror 21 which is provided with two reflecting surfaces 22 and 23 disposed perpendicular to each other. The prism-shaped mirror 21 can be detachably inserted into the optical path in the zoom lens X. When the zoom lens X is in its normal image-taking state, the prism-shaped mirror 21 is out of the effective beam of light passing from the forward relay group 5 to the rearward relay group 7. Upon image-taking the test pattern chart 2' of the pattern projector Z, the prism shaped mirror 21 is inserted into the effective beam of light.

The pattern projector Z also includes a condenser lens 27 for collecting, on the test pattern chart 2', the light which is reflected by the reflective surface 22 after it has passed through the forward relay group 5, a diffusion plate 28 such as a frosted glass, a optical-path deflecting prism 24 having two reflecting surfaces 25 and 26 which are disposed perpendicular to each other, a projecting lens 8 for image-forming the test pattern chart 2' onto the image pickup tube in cooperation with the rearward relay group 7 and a iris diaphragm 4' which is optically conjugate with an iris diaphragm 4 of the zoom lens X.

The light which enters the zoom lens X passes through the zoom portion I and the forward relay group 5 and then is reflected by the mirror surface 22 of the prism-shaped mirror 21 to enter the condenser lens system 27. The light from the condenser lens system 27 is deflected by the reflecting surfaces 25 and 26 of the optical-path deflecting prism 24 to illuminate the test pattern chart 2'. The light which has passed through the test pattern chart 2' enters the projecting lens 8 and then passes therethrough to the reflecting surface 23 of the prism-shaped mirror 21. After being reflected by the prism-shaped mirror 21, the light reaches the light-receiving surface of the image pickup tube 3G through the color separation prism Y. Incidentally, FIG. 2 shows only the color portion in the green zone in the color separation prism Y. Thus, the image of the test pattern chart 2' is formed on the light-receiving surface of the image pickup tube 3G by the projecting lens 8 and the rearward relay group 7.

Under such a situation, if an object ahead of the zoom lens X is image-formed on the test pattern chart 2' by means of the zoom portion I, the forward relay group 5 and the condenser lens system 27, the images of the test pattern chart 2' and object overlap each other. This is inconvenient for adjusting the camera. In order to overcome this problem, a diffusion plate 28 is located in the condenser lens system 27. Even if the diffusion plate 28 is disposed in the zoom portion I or the forward relay group 5, the same effect can be obtained. However, since the diffusion plate 28 is required only upon using the pattern projector, it is preferred that the diffusion plate 28 be removably mounted in the pattern projector.

In the television camera, a visual field can be ensured through a television receiver for monitoring or an electronic finder. Accordingly, if the image of the object can be vignetted until it becomes invisible, the diffusion plate 28 can be replaced by another plate having less diffusion or the diffusion plate 28 itself can be omitted. If the diffusion plate is not used, loss of light quantity will be decreased or become zero. In this case, the zoom ring and focusing ring are rotated in such a manner that the image of object becomes invisible on the test pattern chart 2', conforming the relationship between the images of the pattern chart 2' and object through the monitoring television set or the like.

In respect to the color temperature in the pattern projector, the same source of light as that used to illuminate an object to be image-taken is utilized in the pattern projector, and the zoom lens X is used as a common zoom lens. A transmittivity only in the pattern projector Z has a substantially flat characteristic curve since the total thickness thereof is relatively small so that it can be corrected by coating or the like.

Light quantity is adjusted by means of the iris diaphragm 4 in the zoom lens X. If the condenser lens system 27 is determined in optical constant such as focus length of the like in such a manner that the irises 4' and 4 of the projecting lens 8 and zoom lens X are just or substantially conjugate with each other, a uniform illumination can be effected. Of course, the quantity of light can be adjusted by means of the iris diaphragm 4'.

In using the pattern projector of this embodiment, the zoom lens X is directed to an object having white color or substantially no color and then positioned at such a location that the object is the most vignetted, or adjacent the longest focus length thereof to set the focus either at the nearest or infinite length. Thereafter, the camera is changed to operate the pattern projector so as to adjust the light quantity by using the iris diaphragm 4 of the zoom lens X. Thus the test pattern chart 2' is illuminated by a light having a proper light quantity and the same color temperature as in the case of the illuminated object. The image-taking state by the pattern projector will be coincident with the image-taking state of the test pattern illuminated by the external source of light.

In this embodiment, the prism-shaped mirror 21 and the optical-path deflecting prism 24 can be replaced by the conventional flat mirrors, respectively.

This invention provides coincidence of the image taking states with high accuracy since the color temperature is determined under the illumination condition which is confirmed through the monitor and the like, by illuminating in a through-the-lens (TTL) system as described hereinbefore.

In the above embodiment of this invention, the rereflecting surfaces 22, 25, 26 and 23 define an optical bypass path in which the test pattern chart is located. This is adopted because the conventional compact zoom lens provides small spaces between the lens components. If the space between the forward and rearward relay groups 5 and 7 is wider, the test pattern chart can be inserted into the optical path in the zoom lens. In this case, the condenser lens and diffusion plate may be disposed between the test pattern chart and the forward relay group 5. Between the test pattern chart and the rearward relay group 7 there can be located a projecting lens for forming the image of the test pattern chart on the image pickup tube in cooperation with the rearward relay group 7.

Figure 3:
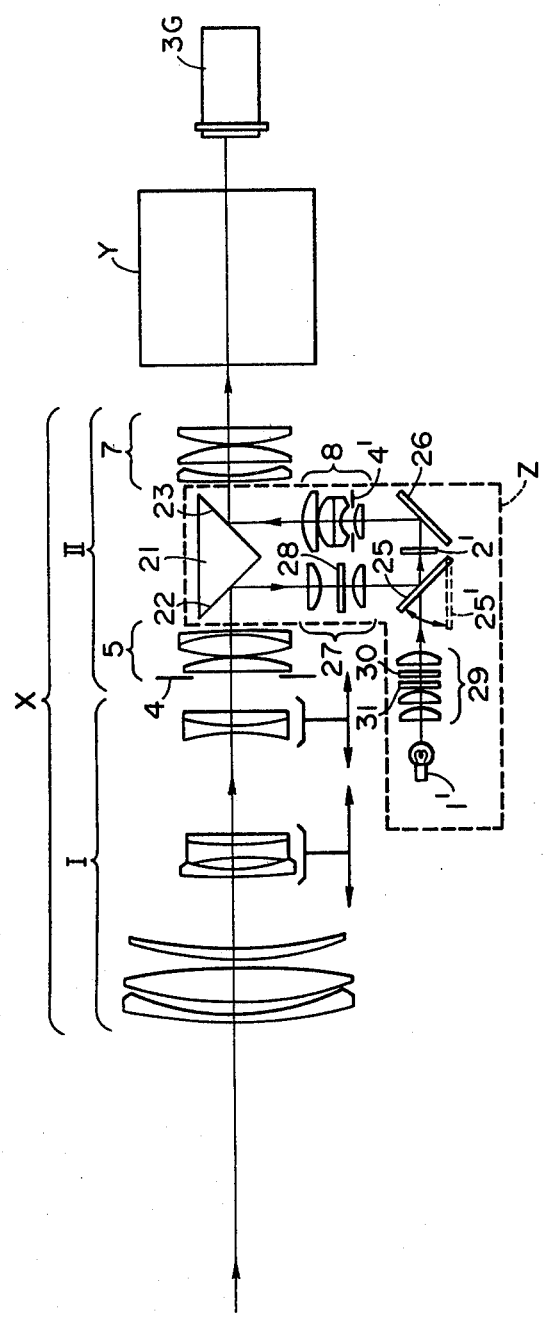
FIG. 3 is a sectional view of another embodiment according to this invention.

FIG. 3 shows another embodiment of this invention wherein similar parts are designated by similar reference numerals. This embodiment is different from the first embodiment shown in FIG. 2 in that the reflecting surfaces 25 and 26 are replaced by the respective flat mirrors. The mirror 25 can be pivoted into another position 25' shown by a broken line, if required. The embodiment in FIG. 3 includes a source of light 1' such as a tungsten lamp, a condenser lamp 29, a color-temperature changing filter 30 and a ND filter 31. The mirror 25 is adapted to be swung immediately as the light source 1' is turned on.

When the optical-path selecting mirror 25 is shifted into the position 25', the test pattern chart 2' is illuminated by the source of light 1' through the condenser lens system 9. The subsequent advance of light is similar to that in the first embodiment of FIG. 2.

Figure 1:
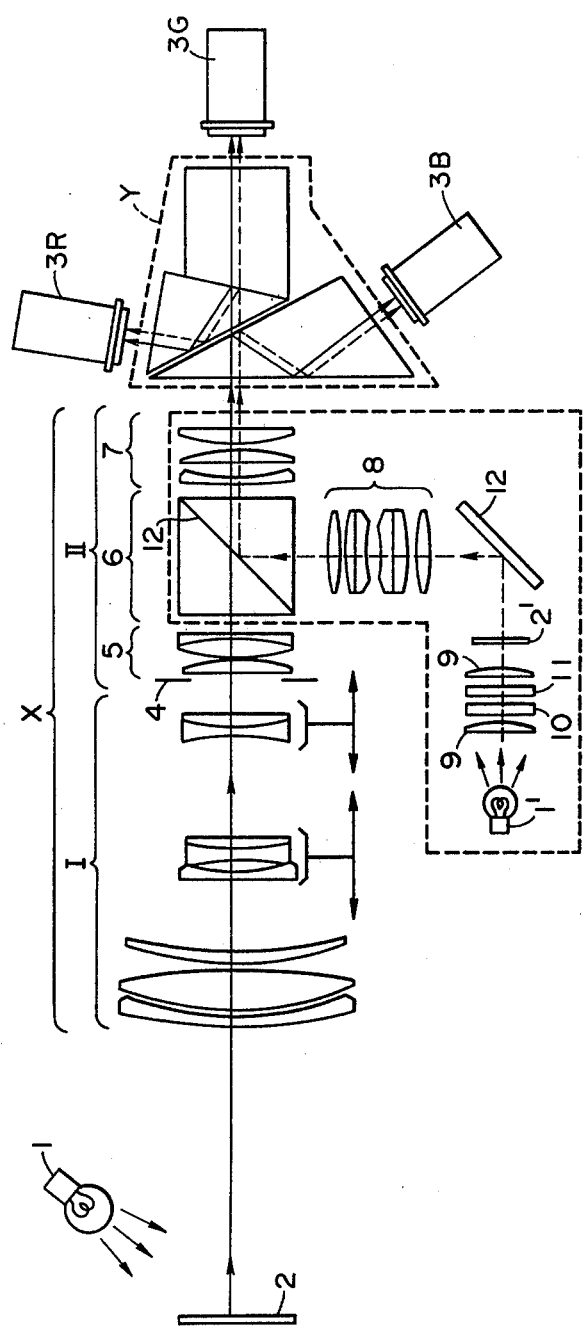
FIG. 1 is a sectional view of the well-known optical system in the prior art television camera.

In respect to the color temperature and quantity of light, the color filter 30 (spectral correction filter) and the ND filter 31 are located in the condenser lens system 29 for the same reason as in FIG. 1. For example, the image-taking state by the pattern projector is caused to be coincident with that in the test pattern which is illuminated by the external source of light with a color temperature of 3,000° K. If the color temperature in the internal source of light is coincidence with the design-reference color temperature of 3,200° K. or 3,000° K. in the television camera, it is convenient for checking the camera or the like.

In the pattern projector of this embodiment, when the checking operation is accomplished in a place where there is coincidence with the design-reference color temperature of the television camera, such as studio, the optical path selecting mirror 25 is shifted into the position 25' so that the test pattern chart 2' will be image-taken by the illumination of the internal light source. When the camera is used in a place where there is a different color temperature, such as an outdoor location or a place where the color temperature is varied, the optical-path selecting mirror 25 is returned back to its original position so that the test pattern chart 2' will be illuminated by the light passed through the objective lens.

This invention provides a television camera including the illumination system of the internal light source and the TTL illumination system which can be selected, if required, in accordance with any illumination of color temperature so that the image-taking state of an object illuminated by the external source of light will coincide with that of the pattern projector contained in the television camera with high accuracy.

What I claim is:

1. A television camera comprising an objective lens for receiving light from a scene, said objective lens having front lens means and rear lens means located at the image side of said front lens means; photosensitive converting means for sensing at least one image formed by said objective lens; and projection means including a test chart for providing the image of said test chart to said photosensitive converting means, said projection means further including a first optical path for conducting the light which has passed through said front lens means to said test chart and a second optical path for conducting the light from said test chart to said rear lens means.

2. The television camera as defined in claim 1 further including color-separating optical means disposed between said objective lens and said photosensitive converting means for forming color-separated images in cooperation with said objective lens.

3. The television camera as defined in claim 1 wherein said projection optical means includes illuminating means for illuminating said test chart.

4. The television camera as defined in claim 3 wherein said illuminating means includes a source of light, a diffusion plate for diffusing the light and condenser lens means for collecting the light.

5. The television camera as defined in claim 1 wherein said first optical path includes first reflector means disposed in the optical path of said objective lens, means for collecting the light and second reflector means, said second optical path includes third reflector means, projecting lens means and fourth reflector means disposed in the optical path of said objective lens, and said test chart is located between said light-collecting means and said projecting lens means.

6. The television camera as defined in claim 5 further including another diffusion plate disposed between said first reflector means and said second reflector means.

7. The television camera as defined in claim 5 further including means for holding said first and fourth reflector means.

8. The television camera as defined in claim 5 wherein said first and fourth reflector means are removably located with respect to the optical path of said objective lens.

9. The television camera as defined in claim 1 wherein said objective lens has a diaphragm, and said projection means includes an aperture positioned to be substantially conjugate with said diaphragm.

10. The television camera as defined in claim 1 further including means for illuminating said chart, and having a third optical path, and wherein said first optical path includes first reflector means disposed in the optical path of said objective lens, light-collecting means and means for connecting said first and third optical paths with each other, and said second optical path includes projecting lens means for projecting said chart and fourth reflector means disposed in the optical path of said objective lens.

11. The television camera as defined in claim 10 wherein said means for connecting said first and third optical paths is a swingable mirror.

12. The television camera as defined in claim 10 wherein said illuminating means includes a source of light, light-collecting means, a spectral correction filter and a diffusion plate.

* * * * *